Dec. 9, 1958  R. STEINER  2,864,036
PROTECTION SYSTEM FOR ELECTRIC WIRING
Filed Jan. 30, 1953

INVENTOR.
RUDOLF STEINER
BY
ATTORNEYS

United States Patent Office 2,864,036
Patented Dec. 9, 1958

2,864,036

PROTECTION SYSTEM FOR ELECTRIC WIRING

Rudolf Steiner, Levittown, Pa.

Application January 30, 1953, Serial No. 334,385

5 Claims. (Cl. 317—44)

(Granted under Title 35, U. S. Code (1952), sec. 266)

The invention described herein may be manufactured and used by or for the Government of the United States of America for governmental purposes without the payment of any royalties thereon or therefor.

This invention relates to a means for protecting electric wiring and is directed particularly to apparatus for protecting aircraft power wiring and associated equipment from damage due to dangerous overloads, excessive overloads because of short circuits, and arcing across wires or to ground caused by insulation breakdown. Such conditions often produce fault currents below and above the rated response level of the usual circuit-breaker protective device energized by excessive current in the power circuit itself. Thus, since the ordinary main-line circuit breaker is capable only of disconnecting the electrical system from the source of current in excess of its rated capacity, complete short-circuit protection is not attained, for damage will usually have been done prior to the excessive overload current operating the circuit breakers.

One of the most frequent failures causing fault currents below the response level of conventional circuit protective devices, and at the same time one of the most critical conditions, is that due to arcing. If the arcing develops hectically, it may be noticed, if at exposed places, by the brightness of the arc, or by the flames of the burning or charring insulation. Most arcing, however, is of the sneaking type, burning slowly and drawing less current than the operating current of the conventional protective circuit-breaker. Since such breakdown is usually very difficult to detect and locate, it often goes unnoticed until the condition worsens to such an extent that the electrical system is seriously damaged.

Accordingly, it is an object of this invention to provide a means for indicating small fault currents in power wiring so that the condition causing the current leakage can be corrected before it worsens to the extent that damage results.

It is another object of this invention to provide a fault-sensing device of the character described that will open its associated power circuit at a predetermined maximum value of fault current, thereby offering protection against excessive overloads.

It is a further object of this invention to provide a fault-sensing device of the above character including means to perpetually verify its operating condition without impairing its preparedness to respond in opening the controlled circuit upon overload.

Other objects and many of the attendant advantages of this invention will readily be appreciated as the same becomes better understood by reference to the following detailed description when considered in connection with the accompanying drawings wherein.

Figure 1:
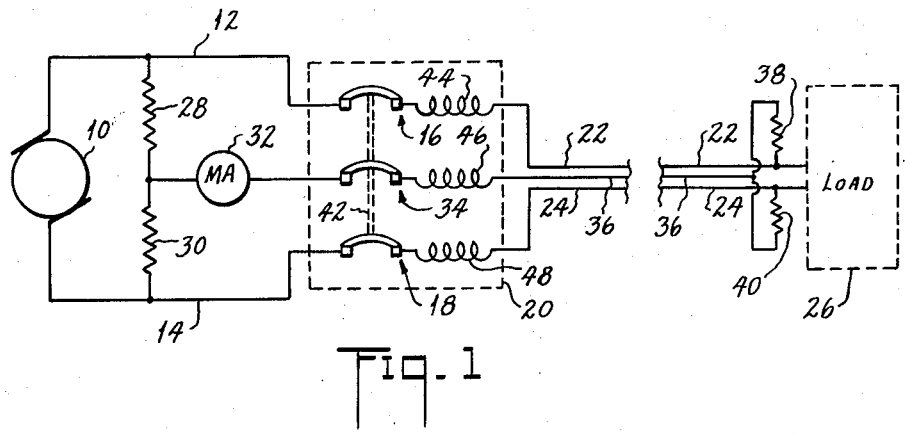
Figure 1 is a schematic drawing of an ungrounded two-wire D.-C. power system embodying the invention.

The present invention is contained in a shunt circuit, which comprises the lead or line 36 in the embodiment of Fig. 1, and which operates to protect a power circuit with which it is associated. The power circuit can comprise one or more feeder lines, such as the feeder lines 22, 24 in Fig. 1. The protective shunt circuit is particularly useful in an electrical system, of which the feeder line is positioned along a path where it is generally concealed and not under observation, and where it is not readily accessible, supplying a load such as 26 which can be positioned physically remote from its source 10 of electrical power.

In Figure 1 of the drawing, which illustrates an ungrounded two-wire D.-C. system embodying the invention, the number 10 designates an electric generator connected by wires 12 and 14 through circuit-breaker units indicated by numbers 16 and 18 of a triple-unit circuit-breaker 20 to a pair of load wires or feeders 22, 24 terminating at a remote load 26. In accordance with the invention, a series branch circuit is established across the full operating voltage near the generator 10, said circuit comprising a pair of resistors 28 and 30 of equal value. The common junction point of the resistors 28 and 30 is connected in series through an indicating milliammeter 32 and the circuit-breaker unit 34 of the triple-unit circuit-breaker 20 to a bare fault-sensing wire 36, substantially coextensive with the feeders 22 and 24, and disposed with respect thereto as hereinbelow described. The load end of the fault-sensing wire 36 is connected to a pair of resistors 38, 40, of different relative ohmic value, but preferably of higher values than the resistors 28 and 30. The remaining terminals of the resistors 38 and 40 are connected to the load ends of the feeders 22 and 24, respectively.

Figure 3:
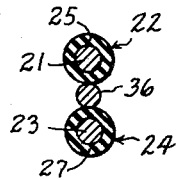
Figure 3 is a cross-section view of one form of fault-sensing conductor comprising the invention, showing its disposition relative the main conductors.

Figure 3 illustrates how the fault-sensing wire 36 is interposed in close contact with feeder wires 22 and 24 substantially along their entire length. In accordance with conventional practice, feeder wires 22 and 24 can be paired leads, each consisting of a conductor, 21 and 23 respectively, contained in insulation 25 and 27 respectively. Because of the lower current value carried by exposed conductor 36, it can be of much smaller gage than the conductors 21 and 23, and is secured in any suitable manner between feeder wires 22 and 24 as shown. In this manner, the feeder lines 22 and 24 protect the fine-gaged lead 36 against physical injury. The feeder wires 22 and 24, together with their companion fault-sensing wire 36 are installed so as to be well insulated or removed from grounded metallic objects or structures; so that any breakdown of insulation 21 or 23 along the length of either feeder line, 22 or 24 respectively, results in current flow through the relatively close fault-sensing wire 36.

The resistors 28, 30, 38 and 40 comprise four arms of a simple resistance bridge circuit having the generator 10 as a voltage source and the milliammeter 32 as a sensitive balance indicator. The resistors 38 and 40 differ in resistance by an amount such that a small current, 10 milliamperes for instance, normally flows through the milliammeter 32, the indication of which serves to inform an observer that the fault-sensing system is energized and in working order. If arcing develops, one or the other of the resistors 38 and 40 will be by-passed, thereby changing the slightly unbalanced condition of the bridge circuit as indicated by a change of current reading in the milliammeter 32. Moreover, the direction of swing of the needle of the milliammeter will be indicative of which of the feeders 22, 24 is at fault. The resistors 28 and 30 preferably are of high enough resistance so that current through the milliammeter will be limited to about 50 milliamperes.

The circuit-breaker units 16, 18 and 34 are ganged together, as indicated by the number 42, so as to operate simultaneously when any one of their respective coils 44, 46 and 48 is loaded to the point of operation of its associated circuit-breaker. Whereas the line circuit-breaker coils 44 and 48 are operative only at the usual high-current overload or surge flowing in the power circuit, the fault-sensing wire circuit-breaker coil 46 is such as to open the circuit-breaker at a fault current of about 50 milliamperes, whereby the line is disconnected from the source as soon as a fault current of substantial value develops, but before serious damage can result.

Figure 2:
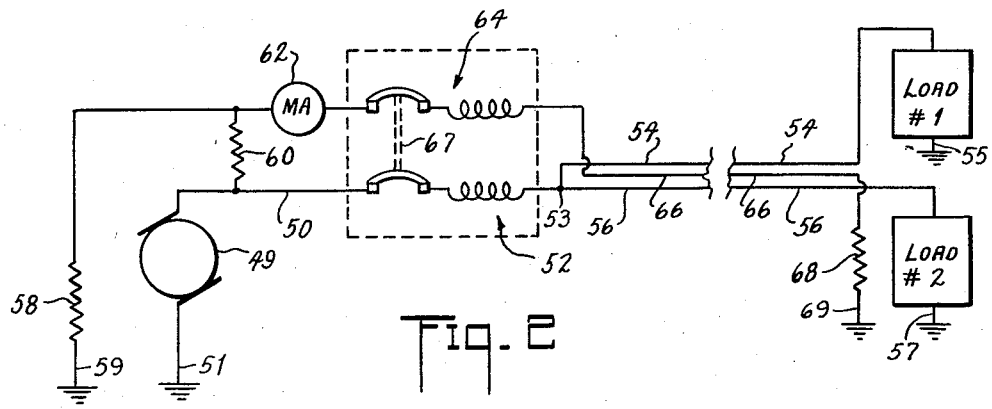
Figure 2 is a schematic drawing of a grounded single-wire D.-C. system embodying the invention.

In Figure 2 of the drawing, which illustrates a preferred embodiment of the invention for a grounded single-wire D.-C. system having two feeders 54 and 56 tapped at 53 from a single bus bar 50. The source 49, in the disclosed system constituting an electric generator, is connected between ground at 51 and a wire or bus bar 50, and is connected through a circuit-breaker unit 52 and its terminal 53 to the several feeder lines 54 and 56, which feed the respective loads Nos. 1 and 2, each being connected to ground at 55 and 57, respectively, to provide a return to power source 49. At the opposite end of their coextensive lengths, the feeder lines 54 and 56 are connected to circuit-breaker unit 52 at a common termination, as indicated schematically at 53. The fault-sensing circuit comprises a voltage-dividing circuit having equal current-limiting resistors 58 and 60 between the generator wire 50 and the ground at 59. The common junction point of the resistors 58 and 60 is connected in series through a milliammeter 62 and a circuit-breaker unit 64 to a fault-sensing wire 66 interposed between, and closely adjacent the feeders 54 and 56 and substantially coextensive therewith. A limiting resistor 68 between the remote end of the fault-sensing wire 66 and ground at 69 completes the circuit, establishing perpetual monitoring of the fault-sensing wire continuity by means of the milliammeter 62. Thus, as in the case of the ungrounded two-wire D.-C. system described above, a low current of about 10 milliamperes will flow to indicate the operating condition of the fault-sensing wire 66, and a higher current value of about 50 milliamperes will cause response of the circuit-breaker unit 64, which, being ganged to the usual line circuit breaker 52 as indicated by the number 67, will cause disconnection of the load circuits of feeder lines 54 and 56 before serious fault currents develop.

Figure 4:
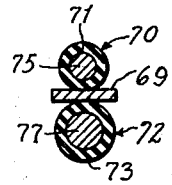
Figure 4 shows a second form of fault-sensing conductor.
Figure 5:
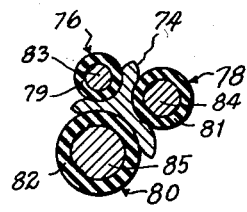
Figure 5 illustrates a third form of fault-sensing conductor.

The fault-sensing wire can be, for example, a bare round wire 36, as shown in Figure 3, and as previously described. An alternative embodiment of fault-sensing line can consist of a flat conductive band or foil 69, which is positioned between the insulations 71 and 73 of respective conductors 75 and 77 of feeders 70 and 72, respectively, as shown in Fig. 4. Another alternative embodiment of a fault-sensing line can consist of a pliable filler 74 having good conduction properties and of sufficient mechanical strength to prevent circuit opening. In this embodiment, the pliable fault-sensing conductor 74 can be positioned and pressed between the insulations 79, 81 and 82 of respective conductors 83, 84 and 85 of the several feeders 76, 78 and 80 of Fig. 5.

In place of the sensitive circuit-breakers in the fault-sensing circuits of Figs. 1 and 2, alarm devices or signals could be actuated, thereby leaving the electric system intact for service, and its disconnection to the judgment of the attendant in charge.

Obviously, many modifications and variations of the present invention are possible in the light of the above teachings. It is therefore to be understood that within the scope of the appended claims, the invention can be practiced otherwise than as specifically described.

What is claimed is:

1. In an electrical system supplying a load from a source of electrical power through an insulated feeder line, a protection system comprising a shunt circuit coupling the source and the load electrically, said circuit including an exposed conductor physically coextensive with said feeder line throughout at least a portion of its critical length, the surface of said exposed conductor being tangent to the surface of the insulation of said feeder line throughout said coextensive portion, the shunt circuit further including fault-sensing electrical means in the line of the exposed conductor, breakdown of said insulation of said feeder line resulting in flow of current through at least part of said exposed conductor and said fault-sensing means.

2. In an electrical system as defined in claim 1, the fault-sensing means including a circuit interrupter with electrical characteristics of closed circuit operation during power feed to the load and operable to open its circuit by overload of the line of the exposed conductor caused by current jumping the gap from the feeder line into the exposed conductor.

3. In an electrical system as defined in claim 1, the fault-sensing means comprising a circuit breaker with electrical characteristics of closed circuit operation during power feed to the load and operable to open its circuit by overload of the line of the exposed conductor caused by current jumping the gap from the feeder line into the exposed conductor, and a connection between the circuit breaker of the shunt circuit and a circuit breaker of the feeder line to open the circuit of the feeder line when the shunt circuit is opened.

4. In an electrical system as defined in claim 1, the system being the two conductor kind embodying a return conductor that constitutes a second feeder line, the exposed conductor being coextensive with the several feeder lines throughout at least a portion of their critical lengths, and the surface of the exposed conductor being tangent to the surfaces of the insulation of the several feeder lines throughout said coextensive portion.

5. In an electrical system as defined in claim 1, the system supplying a plurality of loads each through a feeder line individual to itself, the exposed conductor being coextensive with the several feeder lines throughout at least a portion of their critical lengths, and the surface of the exposed conductor being tangent to the surfaces of the insulation of the several feeder lines throughout said coextensive portion.

References Cited in the file of this patent

FOREIGN PATENTS

| | | |
|---|---|---|
| 132,909 | Great Britain | Oct. 2, 1919 |
| 142,292 | Great Britain | May 6, 1920 |
| 706,540 | Germany | May 29, 1941 |